United States Patent

Sawada

Patent Number: 5,531,819
Date of Patent: Jul. 2, 1996

[54] HOT MELT INK

[75] Inventor: Hidemasa Sawada, Nagoya, Japan

[73] Assignee: Brother Kogyo Kabushiki Kaisha, Nagoya, Japan

[21] Appl. No.: 441,921

[22] Filed: May 16, 1995

[30] Foreign Application Priority Data

Jun. 22, 1994 [JP] Japan ................................. 6-139884

[51] Int. Cl.$^6$ .................................................. C09D 11/12
[52] U.S. Cl. .................... 106/31 R; 106/22 A; 106/23 A; 106/30 A
[58] Field of Search .............................. 106/22 A, 23 A, 106/27 R, 31 R, 30 A

[56] References Cited

U.S. PATENT DOCUMENTS

| | | | |
|---|---|---|---|
| 3,653,932 | 4/1972 | Berry et al. | 106/22 A |
| 4,390,369 | 6/1983 | Merritt et al. | 106/31 R |
| 4,659,383 | 4/1987 | Lin et al. | 106/27 R |
| 4,684,956 | 8/1987 | Ball | 106/22 A |
| 4,758,276 | 7/1988 | Lin et al. | 106/27 R |
| 4,820,346 | 4/1989 | Nowak | 106/22 A |
| 4,878,946 | 11/1989 | Tabayashi et al. | 106/22 A |
| 5,000,786 | 3/1991 | Matsuzaki | 106/22 A |
| 5,124,719 | 6/1992 | Matsuzaki | 346/1.1 |
| 5,350,446 | 9/1994 | Lin et al. | 106/31 R |
| 5,397,388 | 3/1995 | Fujioka | 106/22 A |

FOREIGN PATENT DOCUMENTS 62-295973   12/1987   Japan .

Primary Examiner—Helene Klemanski
Attorney, Agent, or Firm—Oliff & Berridge

[57] ABSTRACT

A hot melt ink of high performance and clear appearance as ink used for hot melt type ink jet recording comprising a paraffin wax as a normal temperature solid wax, ethylene-vinyl acetate copolymer as a resin and an oil-soluble dye (C.I. SOLVENT BLACK 3) as a colorant and a plasticizer having a molecular weight from 100 to 10,000 comprising at least one of materials selected from the group consisting of aliphatic ester, aromatic ester, phosphoric acid ester and oxyacid ester, more preferably, at least one of materials selected from the group consisting of phthalic acid ester, fatty acid ester, polyester type plasticizer, epoxy type plasticizer and trimellitic acid type plasticizer and, most preferably, dioctyl phthalate which is liquid at normal temperature.

18 Claims, 1 Drawing Sheet

HOT MELT INK

BACKGROUND OF THE INVENTION

1. Field of the Invention

The present invention concerns a hot melt ink used in an ink jet recording device and, more in particular, it relates to a hot melt ink used in a hot melt type ink jet recording device in which recording is conducted by heat fusion of ink in a state of a temperature higher than a room temperature.

2. Description of Related Art

As the ink jet recording system, there have been proposed various kinds of systems, for example, a so-called electric field control system of jetting out ink by utilizing an electrostatic attraction force; a so-called drop-on-demand system of jetting out ink by utilizing a vibrational pressure of a piezo element (pressure pulse system); and a so-called thermal ink jet system of jetting out ink by utilizing a pressure resulting from forming and growing bubbles by heating at high temperatures, and they can provide images of extremely high fineness.

For the ink jet systems described above, an aqueous ink using water as a main solvent and an oil ink using an organic solvent as a main solvent have generally been used. Printed images obtained by using the aqueous ink are generally poor in water proofing, whereas the oil ink can provide printed images of excellent waterproofing.

However, since the aqueous and oil inks are liquid at room temperatures, they tend to cause blurring when they are printed on recording paper and cannot obtain a sufficient printing density. Further, they often form depositions from the ink since they are liquid, which causes remarkable deterioration of the reliability in the ink jet recording system.

With an aim of improving the drawbacks of the solvent type inks in the prior art, an oil ink for so-called hot melt type ink jet recording using ink which is solid at normal room temperatures (i.e., about 18° C. to about 27° C.) has been proposed. Specifically, there have been proposed ink containing a dialkyl sebacate in the specification of U.S. Pat. No. 3,653,932, ink containing a natural wax in the specification of U.S. Pat. No. 4,390,369 (Japanese patent Laid-Open No. Sho 58-108271), ink containing a stearic acid in the specification of U.S. Pat. No. 4,758,276 (Japanese Patent Laid-Open No. Sho 59-22973), ink containing acid or alcohol of 20 to 24 carbon atoms and, further, containing therewith ketone of a relatively higher melting point in the specification of U.S. Pat. No. 4,659,383 (Japanese Patent Laid-Open No. Sho 61-83268), ink containing a thermoserring resin having a high hydroxyl value, a solid organic solvent containing a melting point lower than 150° C. and a small amount of a dye substance in the specification of U.S. Pat. No. 4,820,346 (Japanese Patent Laid-Open No. Sho 62-48774), ink comprising a colorant, a first solvent which is solid at a room temperature and liquefied when heated to a temperature higher than the room temperature and a second solvent which is liquid at the room temperature and highly evaporizing for dissolving the first solvent in the specification of U.S. Pat. Nos. 5,000,786 and 5,124,719 (Japanese Patent Laid-Open No. Hei 2-167373), ink containing synthetic wax having a polar group and a dye soluble to the wax in Japanese Patent Laid-Open No. Sho 62-295973.

However, the hot melt inks described above have no concern with considerations such as for sufficient reduction of heat of fusion of inks, sufficient improvement of transparency, prevention of releasability due to flexing of printed matters by providing plasticity, provision of sufficient luster and sufficient dissolution of dyes.

SUMMARY OF THE INVENTION

It is an object of the present invention to provide a hot melt ink, which is optimum as an ink for hot melt type ink jet recording, capable of reducing the heat of fusion without increasing the viscosity of the ink as a whole, improving transparency, providing plasticity, reducing haze (representing the extent of cloud, also referred as cloudiness) and providing luster and, further, easily dissolving a dye as a colorant and capable of providing a sufficient solubility, particularly to a black or cyanine dye.

For attaining the foregoing object, the hot melt ink according to the present invention contains wax which is solid at a normal room temperature, by which is meant about 18° C. to about 27° C., and has a melting point from 50° C. to 150° C., more preferably from 50° C. to 130° C., most preferably from 60° C. to 100° C., a resin, a colorant and a plasticizer. Preferably, the plasticizer has a molecular weight from 100 to 10,000, more preferably from 100 to 2,000, most preferably from 100 to 1,000, and comprises at least one of aliphatic esters, aromatic esters, phosphoric acid esters or oxyacid esters and, more particularly, at least one of phthalic acid esters, aliphatic acid esters, polyester type plasticizers, epoxy type plasticizers and trimellitic acid type plasticizers. The resin preferably has a weight average molecular weight of greater than 500 and the colorant comprises a dye.

In the hot melt ink of the present invention having the foregoing constitution, the wax is a main ingredient of the ink and determines ink properties such as thermal property and viscosity. The resin has a function of providing adhesion to printing paper, controlling the ink viscosity and preventing crystallization of the wax, as well as a function of providing the ink with transparency. The colorant provides the ink composition with color. Further the addition of the plasticizer to the composition can provide advantageous effects capable of reducing the heat of fusion, without increasing the viscosity of the ink as a whole, improving transparency, providing plasticity, reducing haze and providing luster. In addition, the ink shows excellent solubility to various kinds of dyes, particularly, black and cyan dyes and it is thus possible to provide a high performance and clear hot melt ink as ink used for hot melt type jet recording.

As is apparent from the foregoing explanations, the hot melt ink according to the present invention comprises a wax as the main ingredient of the ink which determines the ink properties such as thermal property and viscosity, and resin having a function of providing adhesion to printing paper, controlling ink viscosity, inhibiting crystallization of the wax and providing the ink with transparency and the colorant.

In addition to the composition described above, a plasticizer is also incorporated into the hot melt ink. Without limitation, suitable plasticizers may be, for example, at least one material of aliphatic esters, aromatic esters, phosphoric acid esters and oxyacid esters, preferably, at least one material of phthalic acid esters, aliphatic acid esters, polyester type plasticizers, epoxy type plasticizers and trimellitic acid type plasticizers. The plasticizer provides excellent characteristics of reducing the heat of fusion without increasing the viscosity of the whole ink, improving transparency, providing plasticity, reducing haze and providing luster, and provides excellent solubility to various kinds of dyes, particularly, black and cyanine dye. Thus, a hot melt ink of excellent high performance and clear appearance that can be used for hot melt ink jet recording is produced.

Further, in the hot melt ink according to the present invention, plasticizers can be dissolved easily into the hot melt ink by a function possessed by the resin included therein, so that an ink whose ingredients are difficult to separate can be obtained.

BRIEF DESCRIPTION OF THE DRAWINGS

A preferred embodiment of the present invention will be described in details with reference to the following figures, wherein.

DETAILED DESCRIPTION OF THE PREFERRED EMBODIMENT

Figure 1:
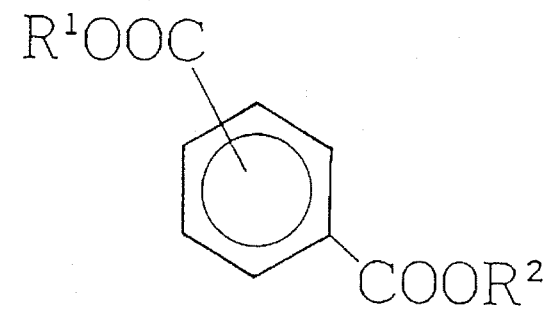
FIG. 1 is a view illustrating a structural formula of a plasticizer in a preferred embodiment according to the present invention.

Explanation will be made by way of examples embodying a hot melt ink according to the present invention.

The hot melt ink for practicing the present invention preferably contains, as ink ingredients, about 30 to about 90% by weight of a wax having a melting point from 50° C. to 150° C., about 5 to about 70% by weight of a resin having a weight average molecular weight greater than 500, about 1 to about 20% by weight, more preferably, about 1 to about 10% by weight of a plasticizer, and about 0.1 to about 10% by weight, more preferably, about 0.5 to about 8% by weight, most preferably, about 0.7 to about 5% by weight of a dye as a colorant.

The wax preferably has a melting point from 50° C. to 150° C., more preferably from 50° C. to 130° C., most preferably from 60° C. to 100° C., and is a so-called normal temperature solid wax (i.e., solid at temperatures of about 18° C. to about 27° C.). The wax is used herein as one of the ingredients of a vehicle, is thermally stable at least at an ink jetting temperature of an ink jet printer, and in a molten state heated to a temperature higher than the melting point.

As the wax, any of known waxes can be used with no particular restriction, for example, petroleum wax, preferably, paraffin wax and microcrystalline wax; wax of plant origin, preferably, candellia wax, carnauba wax, rice wax or hohoba solid wax; wax of animal origin, preferably, bee wax, lanolin or whale wax; mineral wax, preferably, montan wax; synthesized hydrocarbon, preferably, Fischer-Tropsch wax or polyethylene wax; hydrogenated wax, preferably, hardened castor oil or hardened castor oil derivatives; modified wax, preferably, montan wax derivatives, paraffin wax derivatives, microcrystalline wax derivatives or polyethylene wax derivatives; higher fatty acid, preferably, behenic acid, stearic acid, palmitic acid, myristic acid or lauric acid; higher alcohol, preferably, stearyl alcohol or behenyl alcohol; hydroxystearic acid, preferably, 12-hydroxy stearic acid or 12-hydroxy stearic acid derivatives; ketone, preferably, stearone or laurone; fatty acid amide, preferably, lauric amide, stearic amide, oleic amide, eruca amide, ricinoleic amide, 12-hydroxy stearic amide, special fatty acid amide or N-substituted fatty acid amide; amine, preferably, dodecyl amine, tetradecyl amide or octadecyl amine; ester, preferably, methyl stearate, octadecyl stearate, glycerine fatty acid ester, sorbitan fatty acid ester, propylene glycol fatty acid ester, ethylene glycol fatty acid or polyoxyethylene fatty acid ester; polymer wax, preferably, α-olefin maleic acid anhydride copolymer wax. The wax may be used alone or as a mixture of two or more such waxes and it is desirable that the wax is contained within a range from about 30 to about 90% by weight based on the entire ink.

The resin used together with the wax as one of the ingredients of the vehicle has a function of providing adhesion to printing paper, controlling ink viscosity, inhibiting crystallization of the wax, as well as a function of providing the ink with transparency.

For the molecular weight of the resin, the molecular weight was fractionated by gel permeation chromatography using a differential refractometer as a detector or a temperature elevated gas chromatography using a thermal conductivity cell as a detector, and the weight average molecular weight MW obtained from the result of the measurement is preferably from 500 to 500,000, more preferably, 600 to 400,000 and, most preferably, 700 to 300,000.

Further, an oil-soluble resin is preferred for the resin. Appropriate oil-soluble resins include, but are not limited to, for example, olefinic resin, preferably, polyethylene resin, polypropylene resin or polyisobutylene resin; vinylic resin, preferably, ethylene-vinyl acetate copolymer resin, vinyl chloride-vinyl acetate copolymer resin, vinyl acetate resin or ethylene-vinyl chloride-vinyl acetate resin; acrylic resin, preferably, methacrylate resin, polyacrylate resin, ethylene-ethyl acrylate copolymer resin or ethylene-methacrylic acid copolymer resin; phenolic resin; polyurethane resin; polyamide resin; polyester resin; ketone resin; alkyd resin; rosin type resin; hydrogenated rosin resin; petroleum resin; hydrogenated petroleum resin; maleic acid resin; butyral resin; terpene resin; hydrogenated terpene resin; and cumaroneindene resin. The resin (high molecular weight material) may be used alone or as a mixture of two or more such resins and the resin is preferably contained within a range from about 5 to about 70% by weight based on the entire ink.

The plasticizer used together with the wax and the resin has a function of reducing the heat of fusion without increasing viscosity of the entire ink, improving transparency, providing plasticity, reducing haze and providing luster, as well as having an effect of making the dye more soluble.

The plasticizer preferably has a molecular weight from 100 to 10,000, more preferably from 100 to 2,000, most preferably from 100 to 1,000, and may include, but is not limited to, one or more materials of fatty acid esters, aromatic esters, phosphoric acid esters and oxyacid esters and, more preferably, comprises at least one material of phthalic acid esters, fatty acid esters, polyester type plasticizers, epoxy type plasticizers and trimellitic acid type plasticizers. Phthalic acid esters most preferably have a molecular weight of 100 to 500. Also, the most preferred molecular weight for fatty acid esters is 100 to 2,000, for polyester type plasticizers is 100 to 2,000, for epoxy type plasticizers is 100 to 2,000 and for trimellitic acid type plasticizers is 100 to 500.

A most preferred plasticizer is a phthalic acid ester which is liquid at a normal temperature and has a structure as shown in FIG. 1 (in the figure, R1 represents alkyl or allyl group, such as for example having a chain length of from 1 to 25 carbon atoms, and R2 represents alkyl, such as for example having a chain length of from 1 to 25 carbon atoms, or aryl group) and, more specifically, there can be mentioned, for example:

Butylbenzyl phthalate (manufactured by Daihachi Chemical Industry Co., Ltd.);

Dioctyl phthalate (manufactured by KANTO CHEMICAL CO., Inc.); and

Sansonizer-DINP (manufactured by New Japan Chemical Co., Ltd.).

The above-mentioned plasticizer can be used with no particular restriction to any one of them, and can be used alone or as a mixture of two or more such plasticizers and contained within a range from about 1 to about 20% by weight, preferably, about 1 to about 10% by weight based on the entire ink.

As the colorant used for the ink of the present invention, any known dyes and pigments used in oil ink compositions may be used, for example.

As the pigment, either organic pigment or inorganic pigments used generally in the field of the printing technology can be used. Specifically, the following known pigments can be used with no particular restriction, for example, carbon black, cadmium red, molybdenum red, chromium yellow, cadmium yellow, titanium yellow, chromium oxide, viridian, titanium cobalt green, ultramarine blue, prussian blue, cobalt blue, azo pigment, phthalocyanine pigment, quinocridone pigment, isoindolinone pigment, dioxazine pigment, threne pigment, perylene pigment, perinone pigment, thioindigo pigment, quinophthalone pigment and metal complex pigment.

As the dye, oil-soluble dyes, for example, azo dye, disazo dye, metal complex dye, naphthol dye, anthraquinone dye, indigo dye, carbonium dye, quinone imine dye, cyanine dye, quinoline dye, nitro dye, nitroso dye, benzoquinone dye, naphthoquinone dye, xanthene dye, phthalocyanine dye and metal phthalocyanine dye are preferred, but not required.

The dye and the pigment may be used alone or in combination and contained within a range from about 0.1 to about 10% by weight, preferably, about 0.5 to about 8% by weight, and, more preferably, from about 0.7 to about 5% by weight based on the entire ink.

Now, description will be made of experimental examples for embodying the hot melt ink in the embodiment of the present invention.

EXAMPLE 1

In Example 1, the normal room temperature solid wax of the vehicle is paraffin wax (paraffin wax standard product 155, manufactured by NIPPON SEIRO CO., LTD.) having a melting point of about 69° C. and the resin of the vehicle is ethylene-vinyl acetate copolymer (EVAFLEX 210, manufactured by MITSUI POLYCHEMICALS CO., LTD.), the plasticizer is dioctyl phthalate (manufactured by KANTO CHEMICAL CO., INC.) and the oil-soluble dye as the colorant is color index (C.I.) SOLVENT BLACK 3 (Oil Black HBB, manufactured by Orient Chemical Co., Ltd.).

The ink composition used in Example 1 is as shown below.

| | |
|---|---|
| Paraffin wax standard product 155 (paraffin wax) | 83 wt % |
| EVAFLEX 210 (ethylene-vinyl acetate copolymer) | 10 wt % |
| Dioctyl phthalate (plasticizer) | 5 wt % |
| Oil Black HBB (C.I. SOLVENT BLACK 3) | 2 wt % |

Figure 2:
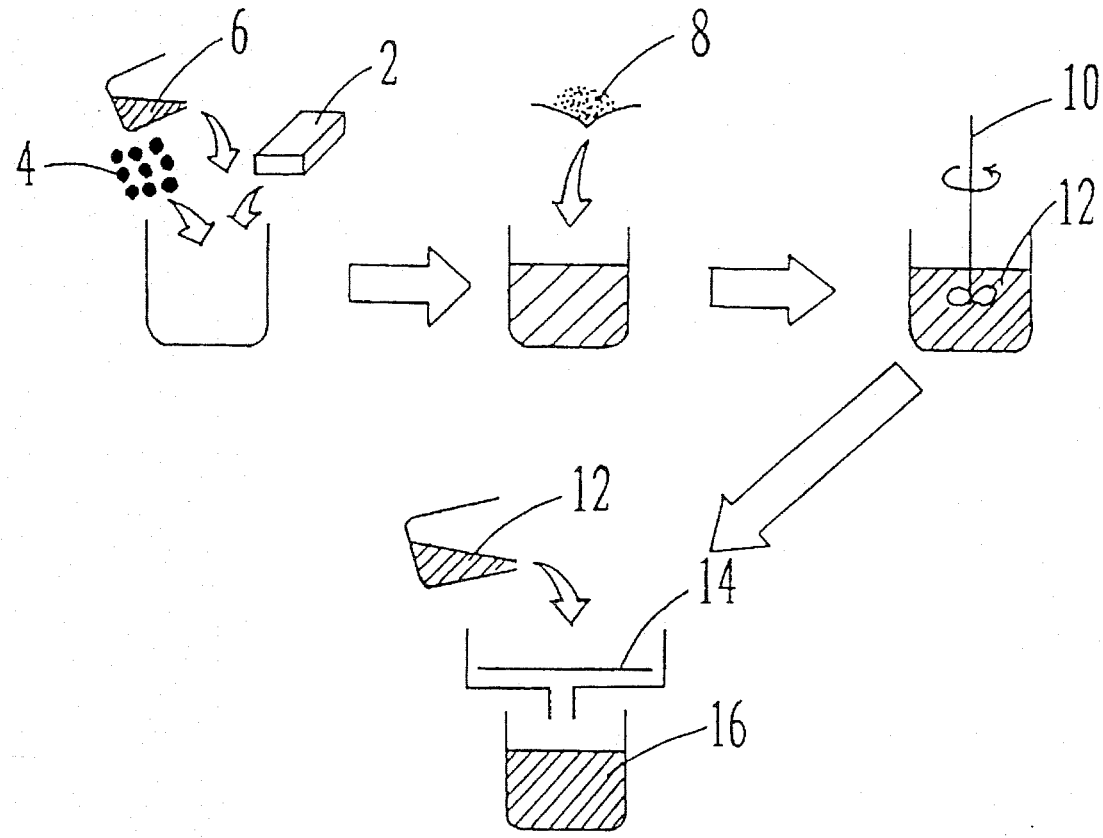
FIG. 2 is an explanatory view illustrating a method of manufacturing ink in Example 1 of the present invention.

The hot melt ink can be produced by the procedures as shown in FIG. 2, for example.

At first, paraffin wax (2), ethylene-vinyl acetate copolymer (4) and dioctyl phthalate (6) are melted by heating at a temperature of about 70° C. to 250° C., preferably, 100° C. to 200° C., to which C.I. SOLVENT BLACK 3 (8) is mixed. Then, they are mixed under stirring at 200 to 10,000 rpm, preferably, 500 to 5,000 rpm by a dissolver (10). The composition (12) mixed under stirring is filtered by using a 2-μm mesh filter (14) by a hot-filtering device manufactured by ADVANTEC TOYO CO., LTD. to obtain a final hot melt ink (16).

The thus prepared hot melt ink (16) is placed by 2 to 3 droplets and melted on a slide glass heated to 120° C., on which a cover glass is placed and pressed slightly. Then, as a result of observation under transmission light by a microscope "XF-UNR" manufactured by NIKON CORPORATION, particles are scarcely observed. Accordingly, it is confirmed that most of C.I. SOLVENT BLACK 3 as the dye is dissolved substantially completely in the ink composition.

The hot melt ink of Example 1 obtained as described above can be used suitably as ink for a hot melt type ink jet printer.

When the ink is loaded to an ink jet printer and heated to an ink jetting temperature (100 to 150° C, preferably, 125 to 135° C), the ink is melted rapidly. Then, as a result of ink jetting, satisfactory fixing performance on recording paper is shown. Further, when the ink is printed also on an OHP (Over Head Projector) film, it shows excellent transparency, and it is confirmed that the ink does not peel but is fixed firmly even when the film is flexed.

Example 2

The normal temperature solid wax of the vehicle in Example 2 is microcrystalline wax (Hi-Mic 2065, manufactured by NIPPON SEIRO CO., LTD.) having a melting point of about 75° C., and the resin of the vehicle is hydrogenated petroleum resin (Arkon P-90, manufactured by ARAKAWA CHEMICAL INDUSTRIES, LIMITED), the plasticizer is butyl benzyl phthalate (manufactured by Daihachi Chemical Industry Co. Ltd.), and the oil-soluble dye as the colorant is color index (C.I.) SOLVENT BLUE 80 (NEOPEN BLUE 808, manufactured by BASF Co.).

The ink composition used in Example 2 is as shown below.

| | |
|---|---|
| Hi-Mic 2065 (microcrystalline wax) | 35 wt % |
| Arkon P-90 (hydrogenated petroleum resin) | 53 wt % |
| Butyl benzyl phthalate (plasticizer) | 10 wt % |
| NEOPEN BLUE 808 (C.I. SOLVENT BLUE 70) | 2 wt % |

The hot melt ink can be produced by the same procedures as those in Example 1.

At first, microcrystalline wax, hydrogenated petroleum resin, and butyl benzyl phthalate are melted by heating at a temperature of about 70° C. to 250° C., preferably, 100° C. to 200° C., to which C.I. SOLVENT BLUE 70 is mixed. Then, they are mixed under stirring at 200 to 10,000 rpm, preferably, 500 to 5,000 rpm by a dissolver. The composition mixed under stirring is filtered by using a 2-μm mesh filter by a hot-filtering device manufactured by ADVANTEC TOYO CO., LTD. to obtain a final hot melt ink.

The thus prepared hot melt ink is placed by 2 to 3 droplets and melted on a slide glass heated to 120° C., on which a cover glass is placed and pressed slightly. Then, as a result of observation under transmission light by a microscope "XF-UNR" manufactured by NIKON CORPORATION, particles are scarcely observed. Accordingly, it is confirmed that most of C.I. SOLVENT BLUE 70 as the dye was dissolved substantially completely in the ink composition.

The hot melt ink of Example 2 obtained as described above can be used suitably as ink for a hot melt type ink jet printer.

When the ink is loaded to an ink jet printer and heated to an ink jetting temperature (100 to 150° C., preferably, 125 to 135° C.), the ink is melted rapidly. Then, as a result of ink jetting, satisfactory fixing performance on recording paper is shown. Further, when the ink is printed also on an OHP (Over Head Projector) film, it shows excellent transparency, and it is confirmed that the ink does not peel but is fixed firmly even when the film is flexed.

Comparative Example 1

An ink composition in Comparative 1 is as shown below.

| | |
|---|---|
| Paraffin wax standard product 155 (wax) | 88 wt % |
| EVAFLEX 210 (resin) | 10 wt % |
| Oil Black HBB (oil-soluble dye) | 2 wt % |

The hot melt ink in Comparative Example 1 can be prepared by the following method.

At first, the paraffin wax standard product 155 and EVAFLEX 210 are dissolved by heating at a temperature about from 70° C. to 250° C., preferably, from 100° C. to 200° C., to which Oil Black HBB is mixed. Then, they are mixed under stirring at 200 to 10,000 rpm, preferably, 500 to 5,000 rpm by the dissolver described above. The composition thus mixed by stirring is filtered using a 2-μm mesh filter by the hot filtering device manufactured by ADVANTEC TOYO CO., LTD. described above to obtain a final hot melt ink.

The thus prepared hot melt ink is placed by 2 to 3 droplets and melted on a slide glass heated to 120° C., over which a cover glass is placed and pressed slightly. As a result of observation through transmission light by the microscope "XF-UNR" manufactured by NIKON CORPORATION described above, coarse particles of greater than 10 μm, considered to be deposited after filtration, are confirmed. Accordingly, it is confirmed in the composition of Comparative Example 1 that Oil Black HBB as the dye is not dissolved sufficiently in the ink composition, that is, the solubility is insufficient.

When the ink of Comparative Example 1 is loaded on a hot melt type ink jet printer and melted by heating to an ink jetting out temperature, it takes a longer amount of time, for example approximately 10 minutes longer, for melting as compared with the inks in Examples 1 and 2.

Further, the fixing performance of the ink in Comparative Example 1 on recording paper after printing by the ink jet printer is not sufficient and it peels off easily.

Further, when the ink is printed also on an OHP film, it is confirmed that the ink on the recording paper is peeled off easily upon flexing the film and, thus, it is not fixed firmly.

What is claimed is:

1. A hot melt ink for use in a hot melt ink jet recording device in which recording is conducted by melting ink under heating at a temperature higher than room temperature, said ink comprising:

a wax which is solid at room temperature and has a melting point of from 50° C. to 150° C.;

5% to 70% by weight of said hot melt ink of a resin having a weight average molecular weight of 500 or greater;

a colorant; and a plasticizer selected from the group consisting of phthalic acid ester, phosphoric acid ester, polyester plasticizer, epoxy plasticizer and trimellitic acid plasticizer.

2. The hot melt ink according to claim 1, wherein the plasticizer has a molecular weight of from 100 to 10,000.

3. The hot melt ink according to claim 2, wherein the plasticizer has a molecular weight of from 100 to 1,000.

4. The hot melt ink according to claim 1, wherein the plasticizer is a phthalic acid ester.

5. The hot melt ink according to claim 1, wherein the resin has a weight average molecular weight of 500 or greater.

6. The hot melt ink according to claim 5, wherein the resin has a weight average molecular weight of from 700 to 300,000.

7. The hot melt ink according to claim 1, wherein the resin is an oil-soluble resin.

8. The hot melt ink according to claim 7, wherein the oil-soluble resin comprises resins selected from the group consisting of olefinic resin, vinylic resin, acrylic resin, phenolic resin, polyurethane resin, polyamide resin, polyester resin, ketone resin, alkyl resin, rosin resin, hydrogenated rosin resin, petroleum resin, hydrogenated petroleum resin, maleic acid resin, butyral resin, terpene resin, hydrogenated terpene resin and cumaronc indene resin, used either alone or in admixture of two or more of said resins.

9. The hot melt ink according to claim 8, wherein the oil-soluble resin comprises polyethylene resin, polypropylene resin or polyisobutylene resin, ethylene-vinyl acetate copolymer resin, vinyl chloride-vinyl acetate resin, vinyl acetate resin or ethylene or vinyl chloride-vinyl acetate resin, methacrylic acid ester resin, polyacrylic ester resin, ethylene-ethylene acrylate copolymer resin or ethylene-methacrylic acid copolymer resin.

10. The hot melt ink according to claim 1, wherein the colorant comprises a dye.

11. The hot melt ink according to claim 1, wherein the colorant comprises a pigment.

12. The hot melt ink according to claim 1, wherein the hot melt ink comprises about 30 to about 90% by weight of the wax, about 1 to about 20 wt % of the plasticizer, and about 0.1 to about 10 wt % of a colorant.

13. The hot melt ink according to claim 12, wherein the plasticizer is present in an amount of from about 1 to about 10% by weight based on the hot melt ink.

14. The hot melt ink according to claim 12, wherein the colorant is present in an amount from about 0.7 to about 5% by weight based on the hot melt ink.

15. The hot melt ink according to claim 1, wherein the wax is thermally stable at least at an ink jetting temperature of an ink jet printer in a state melted by heating to a temperature higher than a melting point of the wax.

16. The hot melt ink according to claim 1, wherein said room temperature is about 18° C. to about 27° C.

17. The hot melt ink according to claim 1, wherein the wax has a melting point of from 60° C. to 100° C.

18. A process for producing a hot melt ink comprising:

mixing a wax which is solid at room temperature and has a melting point from 50° C. to 150° C., a resin and a plasticizer to obtain a mixture, and melting said mixture by heating at a temperature of from about 70° C. to about 250° C. until melting is complete;

adding a colorant and mixing under stirring at 200 to 10,000 rpm; and filtering the composition mixed under stirring.

* * * * *